United States Patent [19]

Botton

[11] 4,110,423

[45] Aug. 29, 1978

[54] PRODUCTION OF CHLORINE AND AMMONIA

[75] Inventor: Roger Jean Botton, Saint-Fons, France

[73] Assignee: Societe RHONE-PROGIL, Paris, France

[21] Appl. No.: 549,871

[22] Filed: Feb. 14, 1975

Related U.S. Application Data

[63] Continuation of Ser. No. 294,386, Oct. 2, 1972, abandoned.

[30] Foreign Application Priority Data

Oct. 4, 1971 [FR] France ................................ 71.35662

[51] Int. Cl.$^2$ .............................................. C01C 1/02
[52] U.S. Cl. .................................... 423/356; 423/504; 252/184
[58] Field of Search ............... 423/235, 237, 239, 356, 423/462, 470, 500, 502, 507, 504

[56] References Cited

U.S. PATENT DOCUMENTS

| | | | |
|---|---|---|---|
| 3,332,742 | 7/1967 | Metaizeau | 423/507 |
| 3,393,048 | 7/1968 | Steinmetz | 423/356 |
| 3,525,590 | 8/1970 | Botton et al. | 423/356 |

*Primary Examiner*—O. R. Vertiz
*Assistant Examiner*—Eugene T. Wheelock

[57] ABSTRACT

A reaction mass for use in the preparation of chlorine and ammonia by contact with ammonium chloride, in which the reaction mass contains iron oxide which is capable of chemically combining with chlorine in the reaction with ammonium chloride and an alkali metal chloride, with the ratio of iron oxide and alkali metal chloride being such that the ratio of the chlorine chemically combined with the iron to the chlorine chemically combined with the alkali metal is less than 1.

7 Claims, 2 Drawing Figures

PRODUCTION OF CHLORINE AND AMMONIA

This is a continuation of application Ser. No. 294,386, filed Oct. 2, 1972, now abandoned.

This invention relates to the production of chlorine and ammonia from ammonium chloride.

Known processes for treating ammonium chloride operate by bringing it into contact with reacting masses constituted essentially of at least one oxide of certain metals and an alkaline metal chloride. These known processes consist generally of three successive principle steps. In a first step, the mass is reduced by a reducing gas; in a second step or chlorination step it is brought into contact with hydrochloric acid or ammonium chloride at a temperature at which the latter compound is dissociated into hydrochloric acid and ammonia, whereby the chlorine of the hydrochloric acid fixes on to the metal of the oxide and the water vapor, possibly also with the ammonia, is liberated, In the third step or de-chlorination step, the mass is oxidized by means of an oxidizing gas whereby the chlorine is freed and is collected. The mass is then subjected to the first step and the succession of steps recommences.

Techniques based upon these known processes have been proposed, notably in French Pat. No. 1,132,727 and its addition No. 84,833. The masses described are based on iron oxide or manganese oxide and a chloride of an alkaline metal and make it possible to obtain compounds of gaseous phases in equilibrium and reaction speeds which can be used industrially.

Equilibrium is to be understood to mean here, in accordance with chemical thermodynamics, the limits towards which a reaction system evolves, for which the temperature, pressure and quantity of material utilized have been defined.

In the following, the terms "chlorine chemically combined with iron" and "chlorine fixed to iron" will be used indifferently.

In the known processes, the equilibrium depends, for the compounds of the masses selected, upon the quantity of chlorine fixed to iron, and this dependence possesses certain disadvantages notably in the execution of these processes, where a control is necessary and also in the installations which must be constructed.

The concepts of the present invention reside in mass compounds, for which the equilibrium values at chlorination and at de-chlorination are independent of the quantity of chlorine fixed to iron and which, moreover, lead to partial pressures, of chlorine for de-chlorination and of hydrochloric acid for chlorination, which are advantageous industrially. In addition, the masses according to the invention necessitate only short contact times, of the same order of magnitude as those frequently used, in order to approach very closely to the quilibrium values of said chlorination and de-chlorination reactions.

The reacting masses according to the invention for use in the preparation of chlorine and ammonia by bringing into contact with ammonium chloride in three successive principle steps of reduction, chlorination and de-chlorination, are solid and comprise iron oxide and a chloride of an alkaline metal, in a molecular ratio: chlorine chemically combined with iron in the chlorination step, chlorine chemically combined with alkaline choride, of less than 1.

Figure 1:
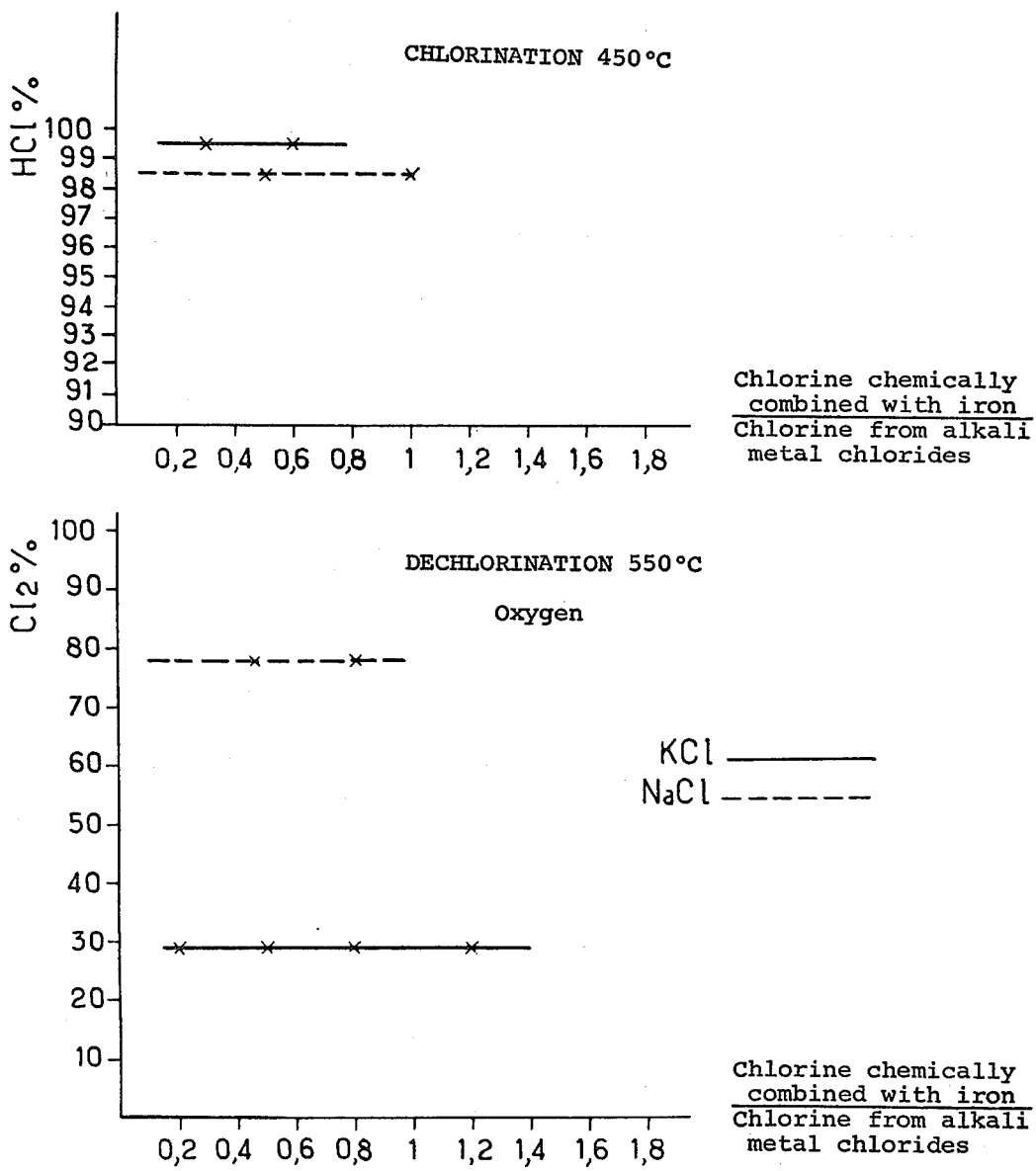
FIG. 1 shows the results of chlorination and dichlorination with the instant invention.

In a preferred form, the mass is constituted by iron oxide and sodium chloride, and the ratio of the chlorine chemically combined with iron to the chlorine chemically combined with sodium is less than 1 and, more preferably of the order of 0.5 at the end of the chlorination step and of the order of 0.01 to 0.2 at the end of the de-chlorination step.

An inert solid such as alumina, silica or silica aluminates may, if desired, be added to the reacting mass.

It is advantageous to select, as a source of iron oxide and inert solid, an ore on a basis of iron oxide in the finely divided state and possibly also previously calcined, in accordance with that described in the Certificate of Addition 85,995 to French Pat. No. 1,395,701.

Notably iron bearing bauxite may with advantage be selected for carrying out the process of the invention.

Constituents such as a copper compound or compound of rare earth metals, notably their chlorides or oxychlorides, may with advantage be added to the mass undergoing reaction. This addition possesses notably the effect of increasing the reaction speeds. The quantities of these constitutents or activators will be selected in such a way that they do not substantially modify the equilibrium reactions of chlorination and/or de-chlorination.

The reacting masses of the invention are utilized in the process for preparing chlorine and ammonia starting from ammonium chloride; in this process the reduction stage is carried out between 500° C. and 600° C., the chlorination stage between 400° C. and 500° C. and the de-chlorination stage between 450° C. and 600° C. in the following manner:

The mass is first activated by a current of reducing gas, such as carbon monoxide, hydrogen or coal gas so as partially to reduce the metallic oxides. The reduction stage may favorably be carried out so as to obtain at the discharge from the reactor the iron oxide forms $Fe_2O_3$ and $Fe_3O_4$. The distribution of the two forms of oxide present simultaneously at his stage is generally of the order of 25 to 75% by weight of iron in the form of $Fe_2O_3$ and 75 to 25% by weight in the form of $Fe_3O_4$.

In a second stage, the previously activated mass is brought into contact with ammonium chloride. The ammonium chloride is immediately dissociated, the ammonia is liberated and is collected and the chlorine is fixed; as an indication, approximately two Kg of chlorine are fixed on 100 kg of a mass containing approximately 15 to 45% by weight of iron in the form of oxides proportioned as above; the result is expressed as a hydrochloric acid treatment yield.

In a third stage, the chlorides formed are oxidized by means of an oxidizing gas, such as air, oxygen or superoxygenated air, the oxidizing gas being if desired accompanied by small quantities of chlorine, and the release of a chlorine-rich gaseous mixture results.

The reacting masses may be prepared by any known process, notably from iron ore, by simply mixing the consitituents in the proportions and granulometry desired, before or during the utilization of the reacting mass in the preparation of ammonia and chlorine from ammonium chloride.

The granulometry of the particles is selected according to the method of utilization of the reacting masses, in fixed beds, moving beds or fluidized beds; the granulometry generally lies in the range 10 to 250 microns when the method of operation uses fluidized beds.

It is particularly advantageous to treat by means of the reacting masses of the invention, ammonium chloride produced in the production of sodium carbonate by the process known as "the ammonia process"; this ammonium chloride contains as its principal impurity sodium chloride, in a quantity which may range, to give an illustration, up to 1%. It has been found that sodium chloride fixes in the mass subjected to reaction and accumulates there. The properties of the mass and the reaction speeds are however not affected. In fact the molecular ratio: chlorine chemically combined with iron/chlorine from sodium chloride, remains less than 1 whatever the excess of sodium chloride.

In practice, if it is desired to operate with a large excess, for example with a ratio tending towards zero, then one would be constrained to operate with large volumes of reacting masses, thus implying installations of large dimensions for the sake of being able to treat finally only a relatively very small quantity of ammonium chloride. This method of operation does not pay industrially. That is the reason why in practice an attempt is made to find a ratio value which shall be a compromise between the productivity of the process and the size of the installation, and not too close to zero although remaining less than 1, for example from 0.01 to 0.5.

In a preferred form of the invention, the reacting masses containing sodium chloride are advantageously prepared in the following manner: finely crushed sodium chloride is admixed in the appropriate proportions to very iron-rich bauxite, which has been brought to the desired granulometry; this constitutes the starting stock of material. The apparatus is supplied from this stock and the installation is set in operation. The sodium chloride introduced by the ammonium chloride fixes progressively in the mass. In order to compensate the losses which may occur during the operation, notably by attrition, an iron rich bauxite having the desired granulometry, and possibly also a supplementary quantity of sodium chloride, are introduced into the apparatus without interrupting the course of the operation.

The reacting masses of the invention may be processed in the preparation of ammonia and chlorine, either in a fixed bed, in a mobile bed, or in a fluidized bed, in any apparatus of known type.

The process may be carried out either continuously in three district reactors arranged in series, or discontinuously in a single reactor.

In a preferred form of embodiment for preparing ammonia and chlorine, reactive masses according to the invention are utilized in a fluidized bed, in an installation constituted of three reactors arranged in series, in which the reacting mass circulates from one reactor to another, one specific reactor serving for reduction, another for chlorination and a third for de-chlorination; an installation of this type has been described in French Pat. No. 1,395,701.

It is particularly advantageous to carry out the processing of the masses according to the present invention in a fluidized bed in reactors not fitted with any trays or any other internal equipment.

To this advantage there may be added the advantages already indicated in the carrying out of the process in a fluidized bed according to French Pat. No. 1,395,701, just preferred to; these advantages also hold good in the application of the present invention, notably with regard to the achieving of thermal equilibrium in the process.

Furthermore, according to the present invention, the equilibrium values at chlorination and at de-chlorination possess the advantage of giving gaseous products at constant pressure. The design and operating of the equipment are consequently facilitated.

Also, since the equilibrium values are independent of the quantity of chlorine fixed to the iron during the chlorination step, it is not necessary to monitor the content of chlorine fixed to iron at the inlet to each reactor. In known processes, it was necessary to monitor this quantity of chlorine and to maintain it constant with considerable accuracy, since otherwise there was a risk of perturbations accurring in all the concentrations in gaseous phases.

The contact periods of the re-agents in the presence of the mass undergoing reaction, which are necessary for approaching the equilibrium values of the chlorination and de-chlorination reactions, are compatible with the requirements of installations of industrial dimensions; for example, in the case of the fluidized bed, the contact time is from 3 to 30 seconds and is preferably from 10 to 20 seconds.

An advantage also results in the preparation of a mass which is simple compared to that of known processes, and which comprises only two principal constituents. The preparation of such reaction masses now involves a simple contacting step and can even be carried out in the apparatus during the course of operation. The compounds do not possess precise limits and permanent control of these limits is not necessary, in contrast with the position in known processes.

The processing of the masses according to the invention also enables all the advantages of the processes of the known state of the art to be obtained; it is possible to select carbonmonoxide as the reducing gas and to produce carbon-dioxide, which can then be directly used for a soda plant.

It does not constitute a departure from the scope of the invention to treat ammonia and hydrochloric acid, which may be in non-stoichiometrical proportions, by bringing them into contact with the masses according to the invention. For example, gaseous hydrochloric acid alone may be treated, producing chlorine.

Having described the basic concepts of the invention, reference is now made to the following examples, which are provided by way of illustration and not by way of limitation, of the practice of the invention.

EXAMPLE 1

An apparatus similar to that described in French Pat. No. 1,395,701 and illustrated in FIG. 2 there, is utilized. This apparatus comprises a sublimater, supplied with solid ammonium chloride, a chlorination reactor, a de-chlorination reactor, and a reduction reactor; these three cylindrical reactors, 100 mm in diameter and 100 cm height, contain fluidized beds and are separated by fluidized bed type separators.

Three different masses are prepared, on a basis of iron bearing bauxite containing approximately 42% iron. The ore is crushed, then calcined at 900° C. for one hour, and then finally ground to produce particles having dimensions from 10 to 150 microns, the dimensions of 20% of the particles being less than 40 microns. Sodium chloride and cuprous chloride are crushed very finely. The following three masses are then prepared by simple mixing:

|  | % NaCl | Bauxite | CuCl |
|---|---|---|---|
| Mass No. 1 | 8.5 | 91.5 | 0 |
| Mass No. 2 | 14 | 86 | 0 |
| Mass No. 3 | 14 | 85.5 | 0.5 |

NUMBER 1

The apparatus is supplied with mass No. 1, the height of the fluidized mass being fixed at 60 cm for all the reactors. Taking account of the flow rates of the reagents, the contact periods are from 4 to 10 seconds. The mass in each reactor and each separator is brought into the fluidized state by very moderate flows of inert gas. The reactors for de-chlorination and reduction are heated to approximately 500° C., and the reactor for chlorination to 450° C. Hydrogen is admitted at a flow rate of 1,400 liters per hour, such that the temperature of the reduction reactor becomes adjusted to 560° C. and that of the chlorination reactor to 440° C. Some of the mass and of the ammonium chloride are introduced into the sublimator, and 950 liters per hour of oxygen is introduced into the de-chlorination reactor. The temperature in the reactor is regulated to 550° C. by regulating the injection of 450 liters per hour of air into the reduction reactor. In the separators, a flow of 200 liters per hour of nitrogen is utilized.

92% of the ammonia which was introduced in the form of ammonium chloride is recovered. At the outlet from the de-chlorination reactor a mixture is obtained of chlorine and oxygen, the chlorine content of which relative to the oxygen is 62%. At the outlet from the reduction reactor, a mixture of nitrogen, steam and hydrogen is obtained. The quantity of hydrogen amounts to 11% of that introduced into the reactor. The mass leaving the chlorination reactor contains 3% of chlorine fixed to the iron. The amount of chlorine fixed to the sodium is 4%.

NUMBER 2

Mass No. 2 is processed under the same conditions as Mass No. 1 and the same results are obtained.

NUMBER 3

The same experience is obtained with Mass No. 3, and at the outlet of the chlorination stage, 95% of the ammonia which was introduced in the form of ammonium chloride is recovered; at the outlet from the de-chlorination reactor, a mixture of chlorine and oxygen having a chlorine content relative to oxygen of 68% is obtained; at the outlet from the reduction reactor there is a mixture of nitrogen, steam and hydrogen. The quantity of hydrogen represents 6% of that introduced into the reactor.

EXAMPLE 2

It is the object of the following experiments to measure the partial pressures at equilibrium furnished by the reaction masses according to the invention: (a) at the second stage, (b) at the third stage of the process.

The operation is carried out using a tube 180 mm high and 38 mm in diameter, heated by means of a fluidized bed in an almost isothermal manner, the approximation not exceeding 1 degree C.

(a) measurement of chlorination equilibriium at the second stage.

Two masses $M_1$ and $M_2$ are prepared, having a composition similar to that of a mass coming from the first stage of the preparation process. These masses are constituted:

from bauxite containing 40% iron by weight, previously calcined and partially reduced. The iron is present half in the form of $Fe_2O_3$, and half in the form of $Fe_3O_4$.

Alkaline chloride: potassium chloride in the case of mass $M_1$, or sodium chloride in mass $M_2$.

Ferrous chloride.

An inert support in a sufficient quantity to fill the tube and absorb the melted products which form. A porous silica was selected.

The quantities are selected such that the composition of the mass remains practically constant during the whole experiment. The tube is heated to the desired temperature with a nitrogen flow of several liters per hour. After the temperature has been stalilized, the nitrogen flow is reduced to 0.5 liters per hour and gaseous hydrogen chloride is admitted. For reasons of experimental facility, the operation was not carried out with the mixture of dissociated ammonia and hydrogen chloride gases coming from ammonium chloride at temperatures higher than 430° C. but with the equimolecular mixture of hydrogen chloride-nitrogen. It was found that in the two cases the partial pressures of hydrogen chloride were practically identical and that the developments were similar.

A flow of 0.5 liters per hour of gaseous hydrogen chloride is admitted, and measurement of the flow of hydrogen chloride gas discharged is begun. This flow develops, then stabilizes after several hours. This stabilized value is recorded for the determination of the partial pressure at equilibrium.

The same experiment is carried out with variations in the proportions of the various constituents of the mass, keeping the quantity of chlorine fixed to the iron less than that fixed to the alkaline metal. It is found that the partial pressures of hydrogen chloride gas are constant at a given temperature.

(b) Measurement of de-chlorination equilibrium at the third stage.

The same apparatus is used as for chlorination, but a mass is prepared having a composition similar to that of a mass which would come from the chlorination stage being brought into contact with oxidizing gases. The mass is constituted of bauxite containing 40% iron, ferric chloride, alkaline chloride and porous silica as the inner support. The bauxite has been previously calcined and oxidized, and the iron is present in the form of $Fe_2O_3$. The tube is heated to the desired temperature under a flow of nitrogen of several liters per hour, then after the temperature has become stabilized, the nitrogen flow is arrested and oxygen is admitted at a ratio of 0.3 liters per hour. The flow of chlorine discharged is measured; this increases and then stabilizes. The stabilized value is recorded for determining the partial pressure at equilibrium.

The partial pressures are observed for the masses in which the constitutents have different proportions, still keeping the quantity of chlorine fixed to the iron less than that fixed to the alkaline metal. It is found that the partial pressures of chlorine are constant at any given temperature. It is also found that the proportion of the constituents can vary within a range wider than that for chlorination, while the partial pressures of gas obtained remain constant.

When oxygen is replaced by chlorine, identical results are observed.

Table 1 below summarizes the values obtained for the partial pressures of hydrogen chloride and chlorine gas, as a function of temperature, in the case of a mass $M_3$ containing potassium chloride and that of a mass $M_4$ containing sodium chloride. The partial pressure of the hydrogen chloride gas is expressed as a fixation yield of HCl% from an inital mixture of one part by volume of hydrogen chloride gas to one part by volume of nitrogen; this mixture is analogous to dissociated $NH_4Cl$. The chlorine partial pressure is related to the mixture of $Cl_2$ and oxygen.

Table 1

| Temperature | | 450° C. | 500° C. | 550° C. |
|---|---|---|---|---|
| $M_1$ | Yield HCl | 99 | 99 | 98.5 |
| $M_3$ | % $Cl_2$ | 29 | 29 | 29 |
| $M_2$ | Yield HCl | 98.5 | 98 | 97.5 |
| $M_4$ | % $Cl_2$ | 43 | 62 | 78 |

The graph shown in FIG. 1 attached gives the results of experiments carried out at 450° C. for chlorination and 550° C. for de-chlorination. The quantitites of chloride fixed to the iron are expressed as fractions of those fixed to the alkaline metal.

It will be seen that, at the chlorination stage, the masses $M_1$ and $M_2$ are substantially equivalent, whereas at the de-chlorination stage the masses containing sodium chloride give higher results than the masses containing potassium chloride.

By way of comparison, measurements were made of the partial pressures at equilibrium provided by a mass on a basis of iron oxide and potassium chloride and which contains also manganese chloride, in accordance with the description given in French Pat. No. 1,421,349.

(a) measurement of chlorination equilibrium.

The procedure is as in Example 2, (a) but manganese chloride is added to the mass. Variations are made in the proportions of the different constituents and it is found that the partial pressure of the hydrogen chloride gas depends directly upon the ratios: chlorine fixed to iron/chlorine fixed to potassium chloride and molecular ratio Mn $Cl_2$ in the mixture of manganese chloride and potassium chloride.

(b) measurement of de-chlorination equilibrium.

The procedure is as in Example 2 (b) but manganese chloride is added to the mass. Variations are made in the proportions of the different constituents and it is found that the partial pressure of the chlorine depends directly upon the same ratios as those upon which the partial pressure of the hydrogen chloride measured in (a) above depends.

Table II shows the values of the partial pressures of hydrogen chloride and chlorine as a function of the above two ratios. The partial pressure of hydrogen chloride is expressed as the yield of HCl. The partial pressure of chlorine is related to the mixture of chlorine and oxygen.

Table II

| $Cl_2$ fixed to KCl | 0.45 | 0.75 | 1 | | | 1.50 | | |
|---|---|---|---|---|---|---|---|---|
| $MnCl_2$/$MnCl_2$ + KCl | 0.25 | 0.25 | 0.15 | 0.40 | 0.1 | 0.15 | 0.25 | 0.40 |
| Yield of HCl | | | 98.5 | 97 | | | | 92.5 |
| % $Cl_2$ | 23 | 40 | 29 | 79 | 34 | 40 | 62 | 92 |

Figure 2:
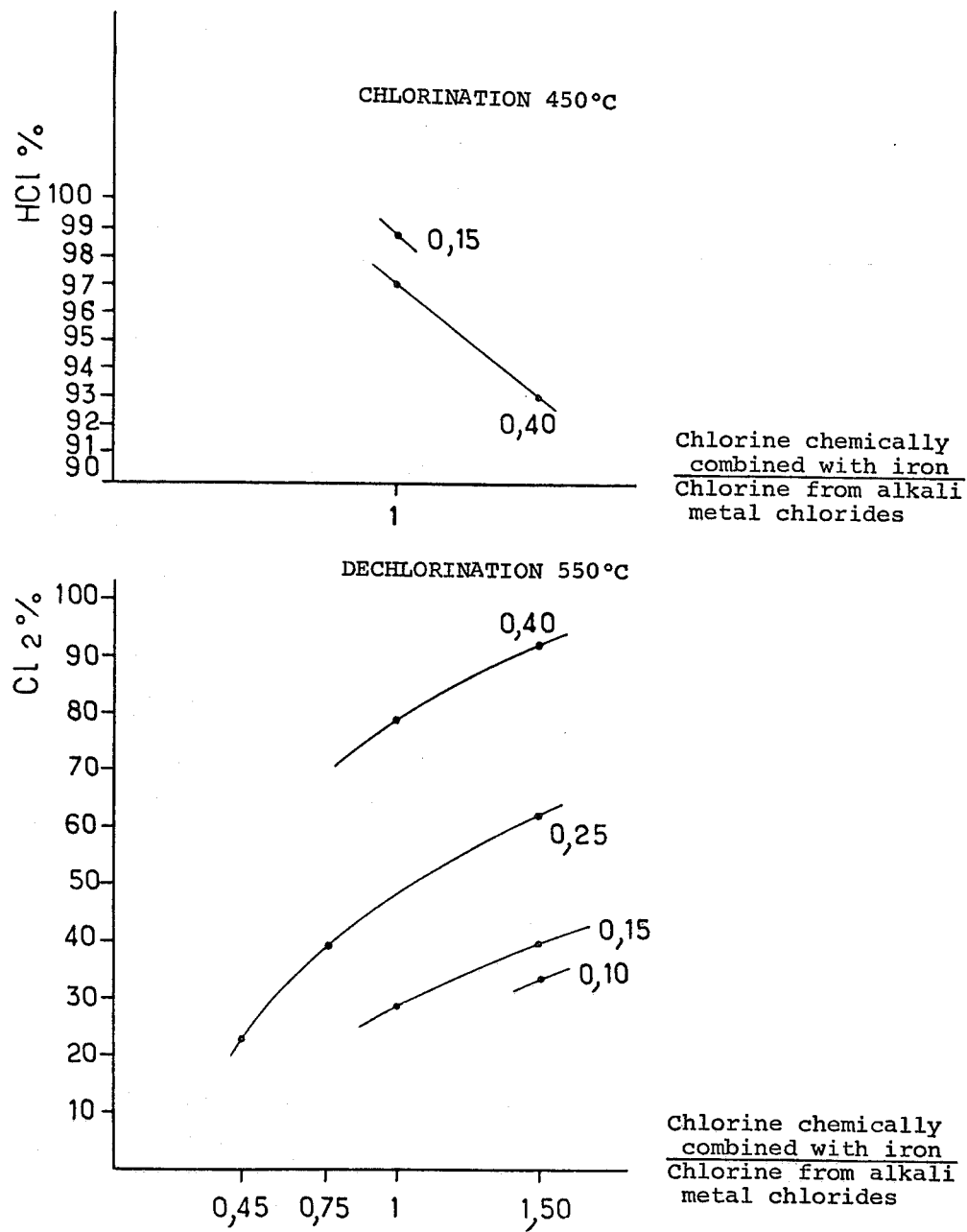
FIG. 2 shows the results of a similar process using the prior art composition.

The results of the experiments carried out at 450° C. for chlorination and 550° C. for de-chlorination have been shown on the graph of FIG. 2.

A comparison of examples 2 and 3 shows that, at equilibrium, it is possible to obtain by using a reacting mass on a basis of sodium chloride according to the invention, yields and chlorine contents of the same order as those obtained by utilizing a complex mass containing three principal constituents, in accordance with the known technique.

In addition, in the case of the mass with sodium chloride, the equilibrium values are of great interest industrially, and a yield is in fact obtained of 98.5% at 450° C. for chlorination, and a chlorine rate of 78% at 550° C. at de-chlorination. These values are moreover independent of the quantity of chlorine fixed to the iron.

I claim:

1. A solid reaction mass for the preparation of chlorine and ammonia by contact with ammonium chloride comprising iron oxide which is capable of chemically combining with chlorine during contact of the reaction mass with ammonium chloride and sodium chloride, with the ratio of the iron oxide and sodium chloride being such that the ratio of the chlorine chemically combined with the iron to the chlorine chemically combined with the sodium is less than 1.

2. A mass according to claim 1 wherein the mass contains a finely divided inert support.

3. A mass according to claim 1 wherein the mass contains at least one compound of copper or of rare earth metals up to 0.5% by weight of said masses.

4. In a process for the preparation of ammonia and chlorine from ammonium chloride in three successive stages of reduction, chlorination and de-chlorination, the improvement comprising carrying out the reduction, chlorination and de-chlorination stages in the presence of a reaction mass comprising iron oxide which is capable of chemically combining with chlorine during contact of the reaction mass with ammonium chloride and sodium chloride with the ratio of the iron oxide and sodium chloride being such that the ratio of the chlorine chemically combined with the iron to the chlorine chemically combined with the sodium is less than 1.

5. A process according to clam 4 wherein the molecular ratio of chlorine chemically combined with iron/chlorine chemically combined with sodium is less than 0.5 at the end of the chlorination stage.

6. A process according to claim 5 wherein the molecular ratio of chlorine chemically combined with iron/chlorine chemically combined with sodium, is from 0.01 to 0.1 at the end of the de-chlorination stage.

7. A process according to claim 4 wherein the mass is in a fluidized bed.

* * * * *